United States Patent [19]

Yano et al.

[11] Patent Number: 5,412,046

[45] Date of Patent: May 2, 1995

[54] POLYETHYLENE AND METHOD OF PRODUCTION THEREOF

[75] Inventors: Akihiro Yano, Yokkaichi; Yutaka Naito, Komono; Kunitaka Yamada; Masaaki Ohtsuru, both of Yokkaichi, all of Japan

[73] Assignee: Tosoh Corporation, Japan

[21] Appl. No.: 212,337

[22] Filed: Mar. 14, 1994

Related U.S. Application Data

[60] Continuation of Ser. No. 794,606, Nov. 15, 1991, abandoned, which is a division of Ser. No. 473,866, Feb. 2, 1990, abandoned.

[30] Foreign Application Priority Data

Feb. 3, 1989 [JP] Japan .................... 1-23736

[51] Int. Cl.6 .................... C08F 4/26; C08F 10/02
[52] U.S. Cl. .................... 526/171; 502/155; 526/172; 526/348.3; 526/348.4; 526/348.5; 526/348.6; 526/352; 526/903
[58] Field of Search .................... 526/171, 172

[56] References Cited

U.S. PATENT DOCUMENTS

| | | | |
|---|---|---|---|
| 3,645,992 | 2/1972 | Elston | 526/348.2 |
| 4,205,021 | 5/1980 | Morita et al. | 526/348.2 |
| 4,438,243 | 3/1984 | Kashiwa et al. | 526/348.2 |
| 4,537,982 | 8/1985 | Starzewski et al. | 526/172 |
| 4,586,995 | 5/1986 | Randall et al. | 526/90 |
| 4,691,036 | 9/1987 | Starzewski et al. | 526/172 |
| 4,724,273 | 2/1988 | Fink et al. | 526/172 |

FOREIGN PATENT DOCUMENTS

| | | |
|---|---|---|
| 0194456 | 9/1986 | European Pat. Off. . |
| 250999 | 1/1988 | European Pat. Off. ............ 526/171 |
| 0250999 | 9/1988 | European Pat. Off. . |
| 3445090 | 6/1986 | Germany . |

OTHER PUBLICATIONS

Keim et al., "Novel Nickel-and Palladium-Complexes with Aminobis(imino)phosphorane Ligands for the Polymerization of Ethylene," *Angewandte Chemie*, vol. 20, No. 1 (1981).

Alexander et al., *Angew. Chem. Int. Ed. Engl.*, 24, 599–601 (1985).

*Primary Examiner*—Edward J. Smith
*Attorney, Agent, or Firm*—Kenyon & Kenyon

[57] ABSTRACT

A polyethylene, having 1 to 60 methyl branches and 1 to 60 hexyl or higher branches per 1000 carbon atoms, a g-value of 0.5 to 0.8, and a limiting viscosity $[\eta]$ of 0.005 to 20.0 dl/g as measured at 140° C. in o-dichlorobenzene, and a method for producing the same by polymerizing ethylene using a catalyst system comprising a coordination nickel compound of zero- or two-valent nickel and an aminobis(imino)phosphorane represented by a general formula (I):

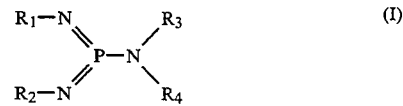

where $R_1$, $R_2$, $R_3$ and $R_4$ may be the same as or different from each other and are respectively n-alkyl, isoalkyl, aryl or trialkylsilyl, in the presence of α-olefin.

8 Claims, 1 Drawing Sheet

POLYETHYLENE AND METHOD OF PRODUCTION THEREOF

This is a continuation of application Ser. No. 07/794,606, filed Nov. 15, 1991, entitled POLYETHYLENE AND METHOD OF PRODUCTION THEREOF, which is a division of application Ser. No. 07/473,866, filed Feb. 2, 1990, both now abandoned.

BACKGROUND OF THE INVENTION

1. Field of the Invention

The present invention relates to a polyethylene having a novel branching structure, and a method of production thereof. More specifically, the present invention relates to production of a polyethylene having a novel branching structure by polymerizing ethylene by employing a special catalyst system with superior polymerization activity. The polyethylene of the present invention is useful as inflation films, injection-molded articles, blow-molded articles, extrusion-coating materials, polymer blending materials, etc. in the same manner as conventional polyethylenes.

2. Description of the Related Art

Generally, polymerization of ethylene by a radical initiator at a very high temperature under a very high pressure gives a polyethylene having branched chains of length comparable with that of the main chain. On the other hand, polymerization of ethylene with a Ziegler-Natta catalyst under a low pressure gives a polyethylene having almost no branches.

For the purpose of producing a branched polyethylene by a method using a Ziegler-Natta catalyst, ethylene is copolymerized, generally with an α-olefin. The resulting polyethylene, however, does not have as long a branch as that of the polyethylene produced by radical polymerization.

In an attempt to produce a low-pressure polyethylene having such a long branched chain, ethylene is oligomerized, for example, by a nickel catalyst disclosed in Japanese Laid-Open Patent Application No. 63-12607 (1988), and the resultant oligomers are copolymerized with ethylene by a Cr catalyst. This method, however, does not gives a branch having a length comparable with that produced by a radical polymerization.

SUMMARY OF THE INVENTION

An object of the present invention is to provide a polyethylene having a novel branching structure.

Another object of the present invention is to provide a method for producing a polyethylene having a novel branching structure.

According to an aspect of the present invention, there is provided a polyethylene, having 1 to 60 methyl branches and 1 to 60 hexyl or higher branches per 1000 carbon atoms, a g-value of 0.5 to 0.8, and a limiting viscosity $[\eta]$ of 0.005 to 20.0 dl/g as measured at 140° C. in o-dichlorobenzene.

According to another aspect of the present invention, there is provided a method for producing a polyethylene, by polymerizing ethylene employing a catalyst system comprising a coordination nickel compound of zero- or two-valent nickel and an aminobis(imino)phosphorane represented by the general formula (I):

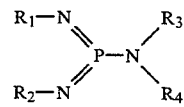

where $R_1$, $R_2$, $R_3$ and $R_4$ may be the same as or different from each other, and are respectively n-alkyl, isoalkyl, aryl or trialkylsilyl, in the presence of an α-olefin.

DETAILED DESCRIPTION OF THE INVENTION

Figure 1:
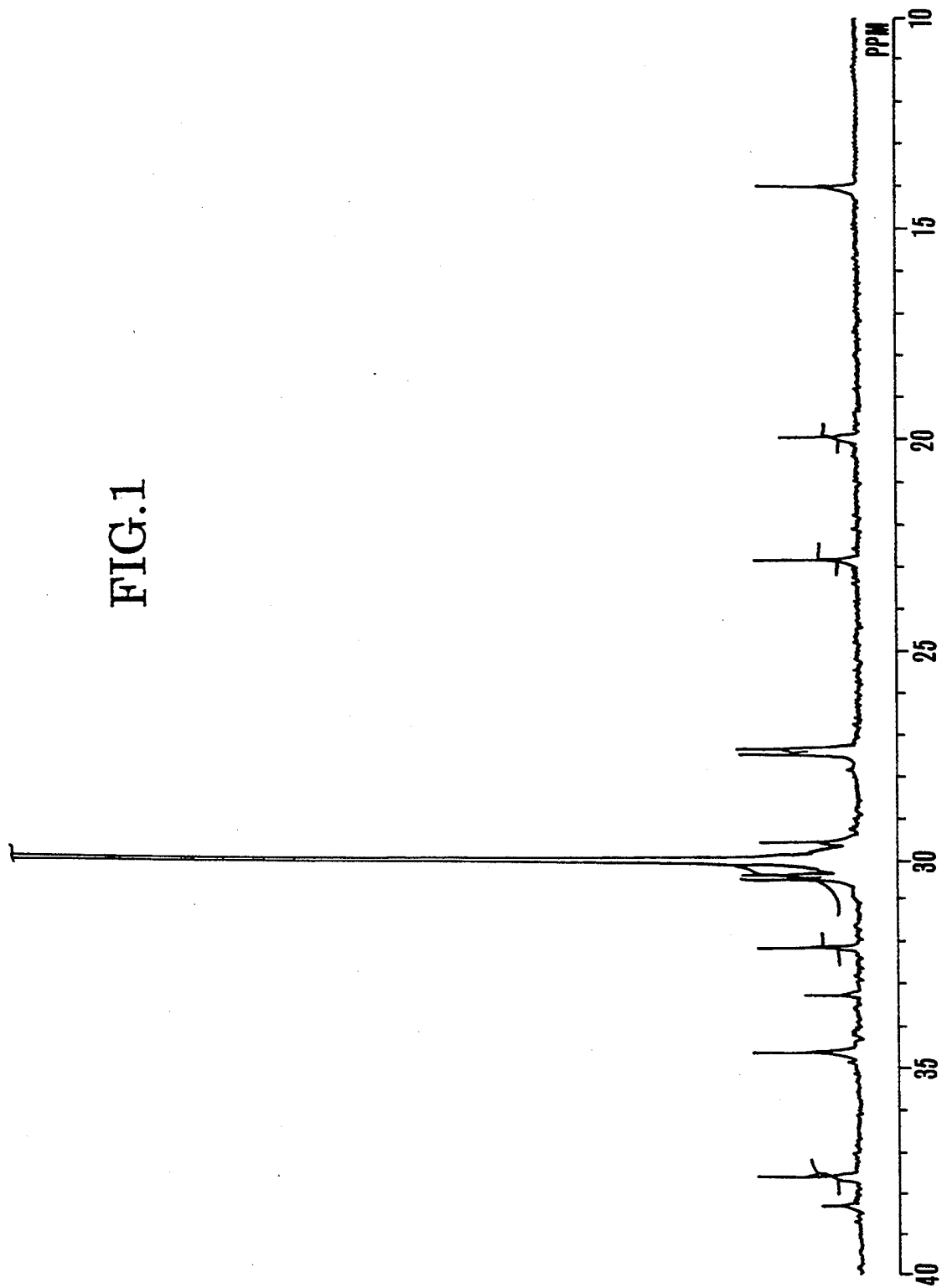
FIG. 1 shows the $^{13}$C-NMR spectrum of the polyethylene produced in Example 1.

The polyethylene of the present invention as mentioned above is produced by polymerization of ethylene under a low pressure. A polyethylene having such a structure has not been produced under a low pressure until now.

The polyethylene of the present invention has, as short chain branches, 1 to 60 methyl branches and 1 to 60 hexyl or higher branches per 1000 carbons. The existence of such branches is confirmed by $^{13}$C-NMR, and the assignment of these branches is made according to, for example, the disclosure of J. C. Randall: J.Polym. Sci., Polymn. Phys.Ed., 11, 275 (1973).

The existence of long chain branches in the structure of the polyethylene is suggested, if the polyethylene has a g-value of less than 1: the g-value being defined by $g=[\eta]/[\eta]_l$ where $[\eta]$ denotes a limiting viscosity of a linear polyethylene and $[\eta]$ denotes a limiting viscosity of the branched polyethylene having the same melt index. The polyethylene of the present invention has a g-value of from 0.5 to 0.8, which suggests the existence of long chain branches having a chain length comparable with the length of the main chain. The polyethylene of the present invention has substantially no ethyl branch or butyl branch, which are found in the polyethylenes produced by radical polymerization at a high temperature under a high pressure, and the he number of branches having 2 to 5 carbon atoms in the polyethylene of the present invention is not more than 1 per 1000 carbon atoms, which also evidences the definite novelty of the present invention.

The method for producing the polyethylene is described below.

In the present invention, specific examples of the coordination nickel compounds of zero- or two-valent nickel include biscyclooctadienenickel, cyclododecatrienenickel, cyclooctatetraenenickel, bisallylnickel, etc.

The aminobis(imino)phosphoranes represented by the general formula (I) specifically includes bis(trimethylsilyl)amino-bis(trimethylsilylimino)phosphorane, etc. These compounds can be prepared by the method, for example, described by O. J. Scherer, N. Kush: Chem. Ber. 107, 2123 (1974).

In polymerization of ethylene employing the two component catalyst system, the ratio of the nickel compound and the aminobis(imino)phosphorane is preferably in the range of from 1:1 to 1:100 (in molar ratio). The respective components may be introduced into the polymerization vessel either in a form of an undissolved solid of in a form of a solution in a solvent, and the order of addition does not affect the structure of the polymer of the activity of the catalyst.

The α-olefin to be added in the polymerization of ethylene is preferably an α-olefin having from 3 to 20 carbons. The specific examples are propylene, 1-butene, 1-pentene, 1-hexene, 1-octene, 1-nonene, 1-decene, 4-methyl-1-pentene, etc. The amount of the α-olefin that may be used is not limited. However, the use thereof in an amount equimolar to nickel or greater improves the catalyst activity. The α-olefin may be used also as a solvent for polymerization.

The polymerization of ethylene may be practiced either in a liquid phase or in a gas phase. The polymerization in a liquid phase is preferably conducted in an inert solvent. The inert solvent may be any of the solvents which are used in the related technical field, such as aliphatic hydrocarbons of 4 to 20 carbons, aromatic hydrocarbons, halogenated hydrocarbons. The specific examples are hexane, heptane, pentane, octane, decane, cyclohexane, benzene, toluene, xylene, chlorobenzene, ethylene dichloride, kerosine, etc.

The preferable polymerization conditions in the present invention are a polymerization temperature of from −78° to 200° C., and a polymerization pressure of from 1 to 200 kg/cm$^2$G.

DETAILED DESCRIPTION OF THE PREFERRED EMBODIMENTS

The present invention is described below in more detail referring to examples without limiting it in any way.

Regarding the structure of the polyethylene produced according to the present invention, the short chain branches are identified by $^{13}$C-NMR with the assignment on the basis of J. C. Randall: J.Polym. Sci., Polym. Phys. Ed., 11, 275 (1973).

The existence of long chain branches in the structure of the polyethylene is indicated by the value of $g=[\eta]/[\eta]_1$, where $[\eta]_1$ denotes a limiting viscosity of a linear polyethylene and $[\eta]$ denotes a limiting viscosity of the branched polyethylene having the same melt index. The g-value of less than 1 suggests the existence of long chain branches.

Example 1

Into a 2-liter magnetic-stirrer-type stainless steel reactor, which had been purged sufficiently with nitrogen, there were added 500 ml of toluene, 2.0 mmol of bis(1,5-cyclooctadiene)nickel, and 2.0 mmol of bis(trimethylsilyl)amino-bis(trimethylsilylimino)phosphorane. The inside temperature was adjusted to 20 ° C. Thereto 65 ml of 1-hexene was added. Then ethylene was fed to maintain the inside pressure at 25 kg/cm$^2$G, and to cause polymerization reaction for 3 hours.

After completion of the reaction, the unreacted ethylene was removed, and the catalyst was decomposed with a hydrochloric acid solution in methanol. The reaction mixture was poured into methanol to recover the polymer. The recovered polymer was dried under vacuum for 8 hours to give 130 g of polymer. The melting point was 94.5° C. as determined by differential scanning calorimeter (DSC), and the limiting viscosity was 1.08 dl/g at 140° C. in dichlorobenzene.

FIG. 1 shows the $^{13}$C-NMR spectrum of the resulting polymer. The peaks resulting from methyl branches are found at 20.4 ppm, 27.5 ppm, 30.4 ppm, 33.2 ppm, and 37.5 ppm, and those resulting from hexyl and higher branches are found at 14.3 ppm, 23.1 ppm, 27.4 ppm, 30.7 ppm, 32.4 ppm, 34.6 ppm, and 38.3 ppm. No other peak resulting from a branched structure is observed. From the spectrum, the number of the methyl branches and the hexyl and higher branches were each found to be 22 per 1000 carbon atoms. No branches having 2 to 5 carbon were found in the polymer. The g-value was 0.70.

Example 2

Into a 2-liter magnetic-stirrer-type stainless steel reactor, which had been purged sufficiently with nitrogen, there were added 500 ml of toluene, 2.0 mmol of bis(1,5-cyclooctadiene)nickel, and 2.0 mmol of bis(trimethylsilyl)amino-bis(trimethylsilylimino)phosphorane. The inside temperature was adjusted to 20° C. Thereto 50 ml of 1-butene was added. Then ethylene was fed to maintain the inside pressure at 25 kg/cm$^2$G, and to cause polymerization reaction for 3 hours.

After completion of the reaction, the unreacted ethylene was removed, and the catalyst was decomposed with a hydrochloric acid solution in methanol. The reaction mixture was poured into methanol to recover the polymer. The recovered polymer was dried under vacuum for 8 hours to give 140 g of polymer. The melting point was 93.6° C. as determined by DSC, and the limiting viscosity was 0.86 dl/g at 140° C. in dichlorobenzene.

The number of the methyl branches was found to be 23 per 1000 carbons and the number of the hexyl and higher branches were found to be 24 per 1000 carbon atoms. No branches having 2 to 5carbons were found in the polymer. The g-value was 0.69.

Example 3

Into a 2-liter magnetic-stirrer-type stainless steel reactor, which had been purged sufficiently with nitrogen, there were added 500 ml of toluene, 1.3 mmol of bis(1,5-cyclooctadiene)nickel, and 1.3 mmol of bis(trimethylsilyl)amino-bis(trimethylsilylimino)phosphorane. The inside temperature was adjusted to 20° C. Thereto 47 ml of 1-decene was added. Then ethylene was fed to maintain the inside pressure at 25 kg/cm$^2$G, and to cause polymerization reaction for 24 hours.

After completion of the reaction, the unreacted ethylene was removed, and the catalyst was decomposed with a hydrochloric acid solution in methanol. The reaction mixture was poured into methanol to recover the polymer. The recovered polymer was dried under vacuum for 8 hours to give 60 g of polymer. The melting point was 92.5° C. as determined by DSC, and the limiting viscosity was 1.03 dl/g at 140° C. in dichlorobenzene.

The number of the methyl branches was found to be 18 per 1000 carbons and the number of the hexyl and higher branches were found to be 16 per 1000 carbon atoms. No branches having 2 to 5 carbons was found in the polymer. The g-value was 0.73.

Example 4

Into a 2-liter magnetic-stirrer-type stainless steel reactor, which had been purged sufficiently with nitrogen, there were added 500 ml of toluene, 2.0 mmol of bis(1,5-cyclooctadiene)nickel, and 2.0 mmol of bis(trimethylsilyl)amino-bis(trimethylsilylimino)phosphorane. The inside temperature was adjusted to 20 ° C. Thereto 65 ml of 4-methyl-1-pentene was added. Then ethylene was fed to maintain the inside pressure at 25 kg/cm$^2$G, and to cause polymerization reaction for 3 hours.

After completion of the reaction, the unreacted ethylene was removed, and the catalyst was decomposed with a hydrochloric acid solution in methanol. The reaction mixture was poured into methanol to recover the polymer. The recovered polymer was dried under vacuum for 8 hours to give 120 g of polymer. The melting point was 94.1° C. as determined by DSC, and the limiting viscosity was 1.15 dl/g at 140° C. in dichlorobenzene.

The number of the methyl branches was found to be 21 per 1000 carbons and the number of the hexyl and higher branches were found to be 22 per 1000 carbon atoms. No branches having 2 to 5 carbons were found in the polymer. The g-value was 0.68.

Example 5

Into a 2-liter magnetic-stirrer-type stainless steel reactor, which had been purged sufficiently with nitrogen, there were added 500 ml of toluene, 2.0 mmol of bis(1,5-cyclooctadiene)nickel, and 2.0 mmol of bis(trimethylsilyl)amino-bis(trimethylsilylimino)phosphorane. The inside temperature was adjusted to 20° C. Thereto 5 ml of 1-butene was added. Then ethylene was fed to maintain the inside pressure at 25 kg/cm$^2$G, and to cause polymerization reaction for 3 hours.

After completion of the reaction, the unreacted ethylene was removed, and the catalyst was decomposed with a hydrochloric acid solution in methanol. The reaction mixture was poured into methanol to recover the polymer. The recovered polymer was dried under vacuum for 8 hours to give 105 g of polymer. The melting point was 90.3 ° C as determined by DSC, and the limiting viscosity was 1.12 dl/g at 140° C. in dichlorobenzene.

The number of the methyl branches and the number of the hexyl and higher branches were each found to be 20 per 1000 carbons. No branches having 2 to 5 carbons were found in the polymer. The g-value was 0.67.

Comparative Example 1

Ethylene was polymerized in the same manner as in Example 1 except that 1-hexene used in Example 1 was not added. 16 g of polymer was produced.

As described above, the present invention produces a polyethylene having short chain branches and long chain branches by low-pressure polymerization of ethylene by employing a specific catalyst and by adding an α-olefin with superior polymerization activity.

What is claimed is:

1. A method for producing an ethylenic polymer having 1 to 60 methyl branches and 1 to 60 hexyl or higher branches per 1000 carbon atoms comprising feeding to a vessel ethylene after bringing into contact in the vessel a coordination nickel compound of zero- or two-valent nickel, an aminobis(imino)phosphorane represented by a general formula (I):

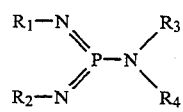

where $R_1$, $R_2$, $R_3$ and $R_4$ may be the same as or different from each other and are respectively n-alkyl, isoalkyl, aryl or trialkylsilyl, and an α-olefin selected from the group consisting of propylene, 1-butene, 1-pentene, 1-hexene, 1-octene, 1-nonene, 1-decene, and 4-methyl-1-pentene, to effect polymerization of ethylene.

2. A method according to claim 1 in which the coordination nickel compound is selected from the group consisting of biscycloctadienenickel, cyclododecatrienenickel, cyclooctatetraenenickel and bisallylnickel.

3. A method according to claim 1 in which the aminobis(imino)phosphorane is bis(trimethylsilyl)aminobis(trimethylsilylimino)-phosphorane.

4. A method according to claim 1 in which the molar ratio of the coordination nickel compound to the aminobis(imino)phosphorane is 1:1 to 1:100.

5. A method according to claim 1 in which the α-olefin has 3 to 20 carbons.

6. A method according to claim 1 in which the polymerization is done at a temperature ranging from −78° to 200° C., at a pressure ranging from 1 to 200 kg/cm$^2$G.

7. A method according to claim 1 wherein the molar ratio of the α-olefin to the coordination nickel compound in the catalyst system is from about 1:1 to about 265:1.

8. A method according to claim 1 wherein the α-olefin is selected from the group consisting of propylene, 1-butene, and 1-hexene.

* * * * *